E. SCHNEIDER.
HYDRAULIC TRANSMISSION APPARATUS.
APPLICATION FILED DEC. 15, 1911.

1,106,245.

Patented Aug. 4, 1914.
8 SHEETS—SHEET 2.

E. SCHNEIDER.
HYDRAULIC TRANSMISSION APPARATUS.
APPLICATION FILED DEC. 15, 1911.

1,106,245.

Patented Aug. 4, 1914.

8 SHEETS—SHEET 7.

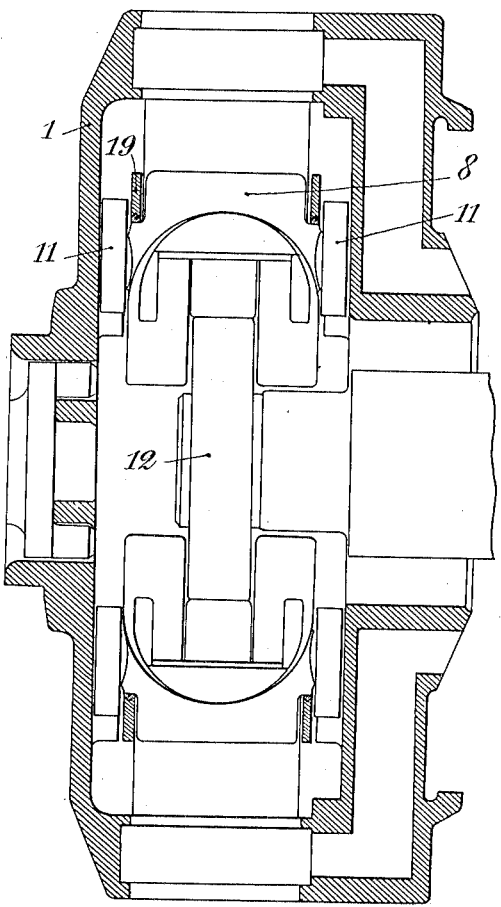

UNITED STATES PATENT OFFICE.

EUGÈNE SCHNEIDER, OF LE CREUZOT, FRANCE.

HYDRAULIC TRANSMISSION APPARATUS.

1,106,245. Specification of Letters Patent. Patented Aug. 4, 1914.

Application filed December 15, 1911. Serial No. 666,055.

*To all whom it may concern:*

Be it known that I, EUGÈNE SCHNEIDER, a citizen of the Republic of France, residing at Le Creuzot, Saône-et-Loire, France, have invented new and useful Improvements in Hydraulic Transmission Apparatus, which is fully set forth in the following specification.

The present invention has for its object improvements in the known hydraulic apparatus for the transmission of movement in which a driving pump actuated by a motor and a driven pump are combined with a distributing mechanism interposed between them, the changes of speed and of direction of running of the driven shaft being obtained by means for varying the eccentricity of the cylinders of the driving pump relatively to the motor. These improvements are applicable to apparatus of the type in which the cylinders of the pumps are carried radially on a drum, the pistons bearing by means of a connecting member such as a rod, upon the eccentric device proper, which is then constituted by a shaft parallel with the driving shaft and which is adapted to be separated from or brought closer to the geometrical extension of the axis of the driving shaft at will from the exterior. In these known devices the relative movements between the cylinders and the pistons necessarily give rise to lateral thrusts by reason of the oblique thrust which, as regards the greater number of cylinders, each connecting member (rod or the like) exerts, at each moment, upon the corresponding piston. In accordance with the invention these lateral thrusts which produce ovalization of the cylinders and pistons are avoided. Between each piston and the thrust member which bears upon the eccentric device proper, an auxiliary thrust member is interposed. The radial movements of this auxiliary member are entirely integral with those of the piston while relatively to the latter they preserve a certain liberty of lateral movement. This interposed auxiliary thrust member is perfectly guided by means of lateral projections in radial guides carried by the drum carrying the cylinders.

Figure 1:
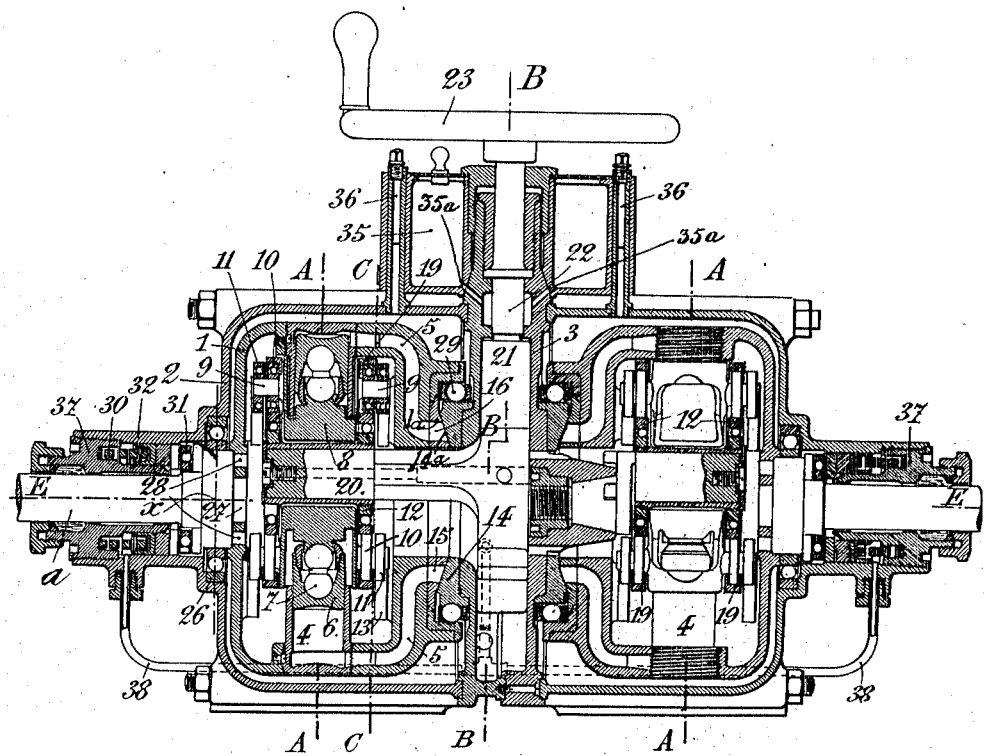
Figure 2:
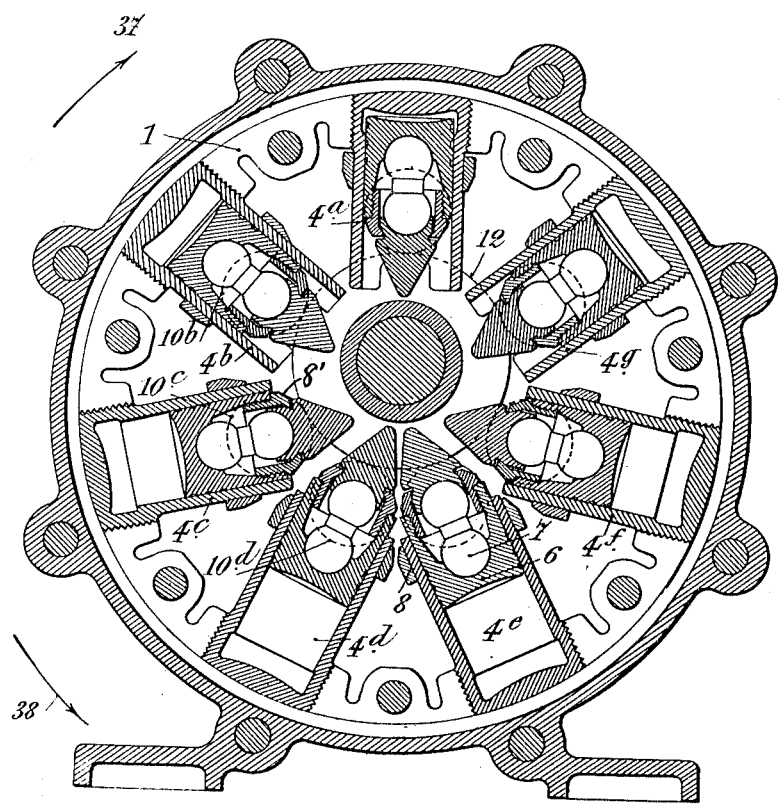
Figure 3:
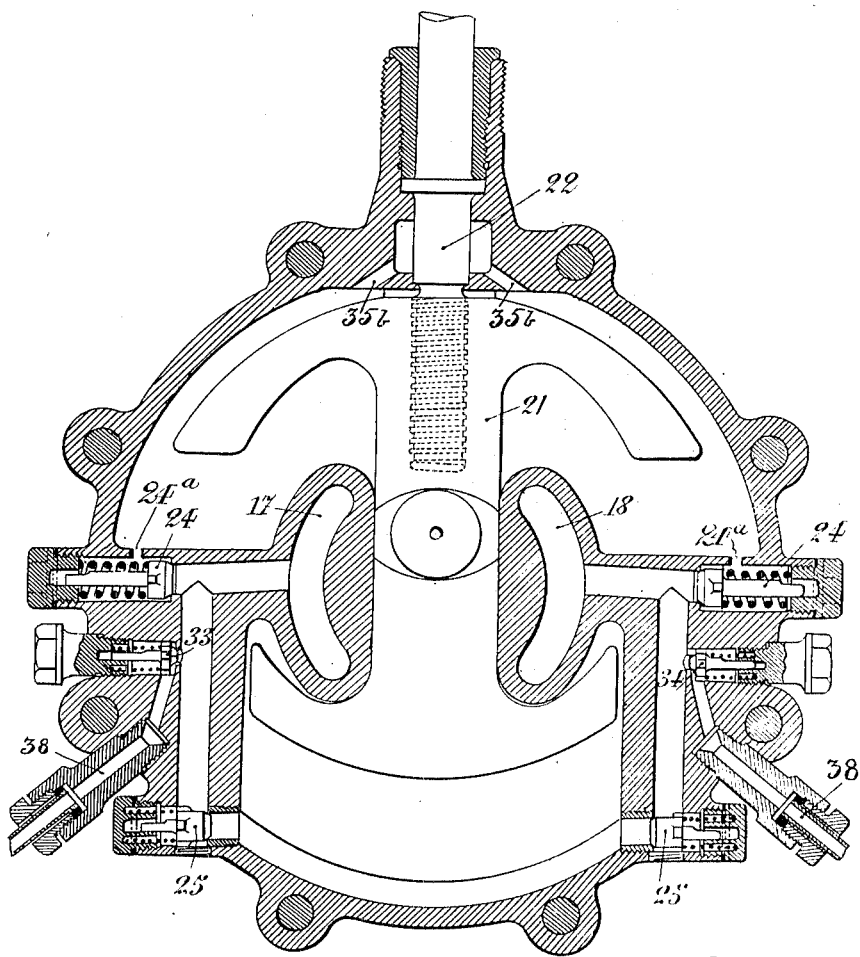
Figure 4:
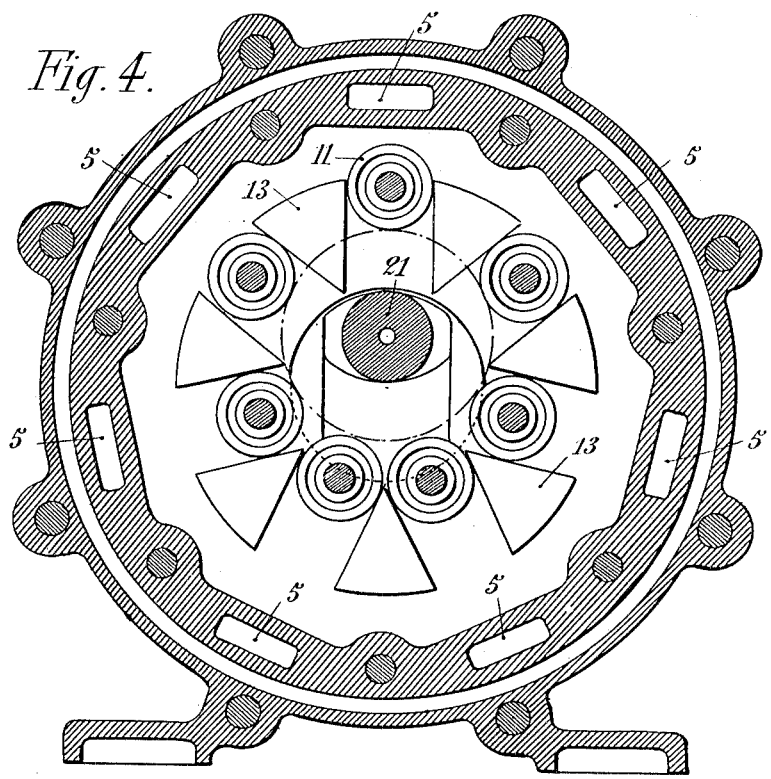
Figure 5:
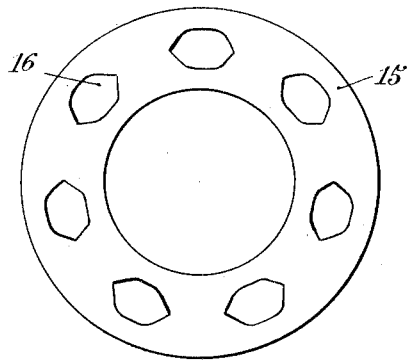
Figure 6:
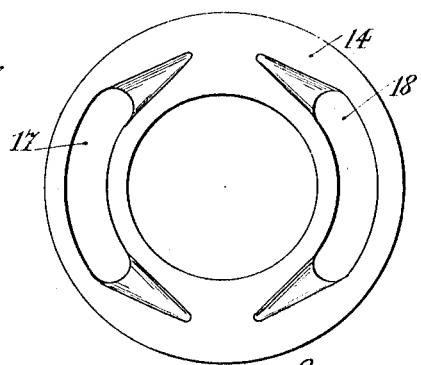
Figure 7:
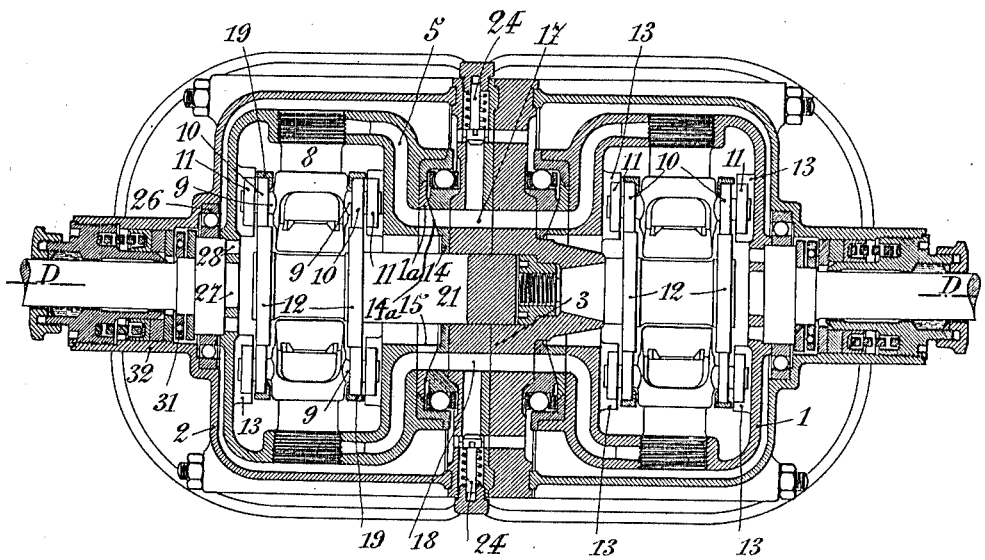
Figure 8:
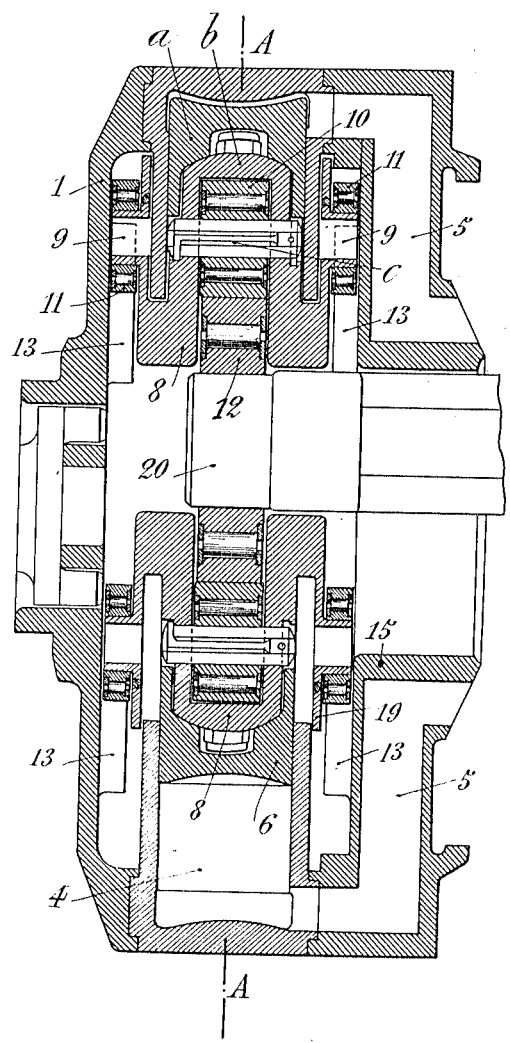
Figure 9:
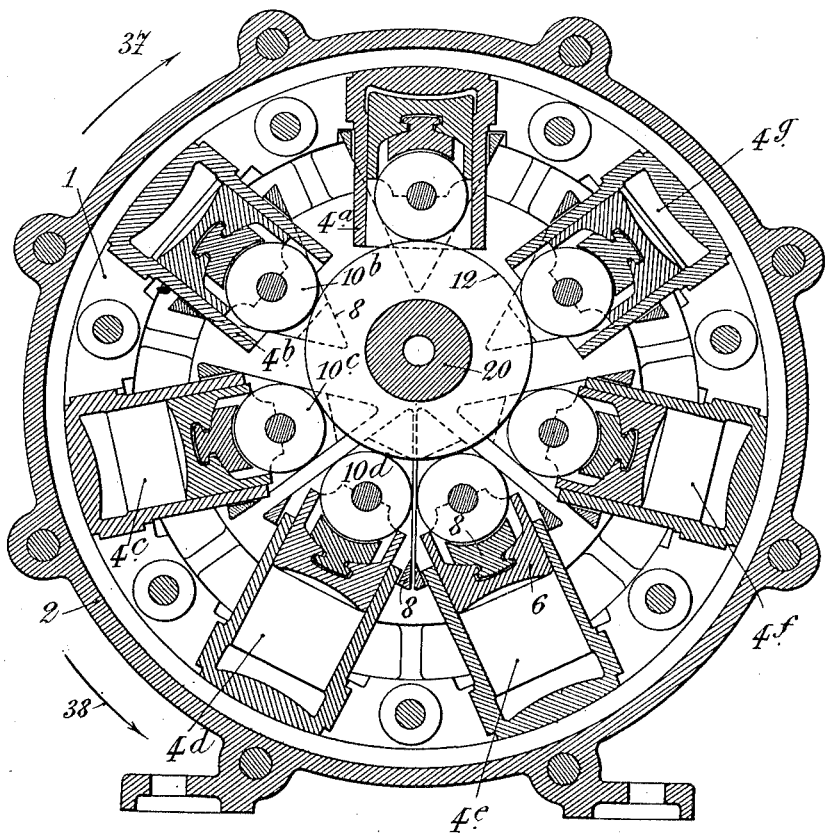

Figures 1 to 7 of the accompanying drawing represent one embodiment of an apparatus provided with the improvement set forth above. Fig. 1 is a longitudinal axial section of the two pumps. Fig. 2 is a cross section to a larger scale on the median plane A A of one or other of the two pumps. Fig. 3 is a cross section on the line B—B of the separator plate. Fig. 4 is a cross section on the line C C of the driving pump. Fig. 5 shows the faces of the drums. Fig. 6 represents the faces of the separator plate. Fig. 7 is a horizontal section on the axis of the two pumps on the line E—E in Fig. 1. Figs. 8, 9 and 10 show respectively in longitudinal section, in vertical cross section on the line A—A in Fig. 8 and in partial horizontal section, a modification of the auxiliary thrust device of the pistons, eliminating lateral strains between the latter and the cylinders.

The driving pump which is represented mainly in the left hand part of Fig. 1 and in Fig. 2 is constituted by a drum or barrel 1 which is driven by the shaft $a$ rotating in a fixed casing 2 assembled with the separator plate 3. Upon its periphery this drum carries a certain number of cylinders (seven for example) arranged along equidistant radii. Each of these cylinders, which are marked $4^a$, $4^b$, $4^c$, $4^d$, $4^e$, $4^f$, $4^g$, is provided with a conduit 5 ending on the circular face of the drum 1 which is in contact with the separator plate 3. Within each of the said cylinders is a piston 6 which in the driving pump is reciprocated as the drum 1 and cylinders revolve by means of disks 12 mounted on an adjustable trunnion 20. For this purpose and to insure a perfect radial movement of each piston in its cylinder and to avoid all lateral thrust each piston is provided interiorly with a spherical socket or housing for receiving one end of a dumbbell shaped rod 7, the opposite head of the rod 7 being received in a spherical housing in a member 8 provided exteriorly with oppositely disposed trunnions 9 on which are mounted anti-friction rolls 10 and 11, rolls 10 being adapted to run on disks 12 and the rolls 11 being guided by radial slide ways 13 integral with the drum 1. The parts of this ball and socket connection are held together by a sleeve 8′. The common axis of trunnions 9 should preferably pass through the center of the head of the rod 7 which is housed in member 8. Each of the rollers 10 is arranged opposite a disk 12 which in Figs. 1 and 2 is represented as being eccentrically located in the upward direction relatively to the axis of the drum 1 (its position can however vary as will hereinafter be explained). The rollers 11 engage with radial slide ways 13 forming one with the drum 1.

The driven pump which is represented in the right hand part of Fig. 1, is composed of elements similar to those of the driving pump with the sole difference that the two disks 12 occupy an invariable position of eccentricity relatively to the axis of rotation of the drum 1. On the left hand side of Fig. 1, the separator plate 3 presents a circular slide face 14 to which the slide face 15 of the drum 1 is applied. The face 15 presents seven orifices 16 (Fig. 5) forming continuations of the conduits 5 of the cylinders 4 and the face 14 presents two symmetrical orifices 17 and 18, elongated in form and continued at their extremities by points; these two orifices 17 and 18 pass right through the separator plate 3 (Fig. 7).

Considering first Fig. 2 as representing the driving pump (left hand pump Fig. 1) and assuming the driving shaft to rotate in the direction indicated by the arrow 37 carrying with it the drum 1, the cylinders 4, the forks 8 and the rollers 10 and 11, it will be noted that the rollers $10^b$, $10^c$, $10^d$ corresponding with the cylinders $4^b$, $4^c$, $4^d$ are pressed outward by the two eccentric disks 12; by the intermediary of the members 8 and of the rods 7 these rollers cause the corresponding pistons 6 to enter their cylinders and consequently to force liquid through the conduits 5 and the orifices 16 into the orifice 17 of the separator plate. The pistons remain perfectly centered in their cylinders as lateral thrusts can only occur between the rollers 11 and the slide-ways 13. Now considering Fig. 2 as representing the driven pump, it will be noted that in the position shown it is the three cylinders $4^b$, $4^c$, $4^d$ that are in communication with the orifice 17 of the separator plate; the liquid under pressure which enters through this orifice 17 therefore tends to force back the pistons of the said three cylinders and these pistons press their rollers 10 against the disks 12. Now it will be noted that owing to the eccentricity of these two disks the direction of these thrust efforts does not pass through the center of the disks; consequently at the point of contact of each of these rollers with the corresponding disk a tangential component is produced; as, on the other hand, the friction resulting from the thrust of the rollers upon the disks 12 is almost nil owing to the fact that the said rollers are mounted on balls, it follows that the said tangential component is, in practice, entirely utilized for producing a movement of rotation of the drum 1 in the direction indicated by the arrow 38. It will also be noted that the rotation of the drum is not produced by the pistons bearing laterally against the cylinders, but by the tangential pressure of the rollers 11 which are mounted on the same trunnions 9 as the rollers 10 and which run in the slideways 13 integral with the drum 1; the rollers 11 can also be mounted on balls as shown in the drawing. Consequently, the tangential pressure that they produce in running on the slideways 13 does not give rise to any appreciable friction. Finally, as the drum 1 is carried at its two extremities upon rings of balls, it follows that the whole of the tangential components of the rollers $10^b$, $10^c$, $10^d$ is utilized with the maximum efficiency for producing the rotation of the drum 1 of the driven pump because the only real friction that has to be considered during the said rotation is that produced between the two faces 14 and 15.

It will readily be seen that in the position illustrated in Fig. 2 while the cylinders $4^b$, $4^c$, $4^d$ of the driving pump send liquid under pressure through the orifice 17 to the cylinders $4^b$, $4^c$, $4^d$ of the driven pump, inversely by the fact of the rotation imparted to the driven pump the cylinders $4^e$, $4^f$, $4^g$ of the latter send back the liquid that they contained to the cylinders $4^e$ $4^f$ $4^g$ of the driving pump through the orifice 18. The same liquid therefore circulates indefinitely between the two pumps, passing under pressure from the driving pump to the driven pump through the orifice 17 and returning from the driven pump to the driving pump through the orifice 18 under the influence of the slight counter pressure produced by the pistons of the driven pump, which, after having produced their driving effort upon the two disks 12 in passing through a seam circumference, are forced back into their respective cylinders in passing through the other half circumference, owing to the eccentricity of these disks. This pistons $4^e$, $4^f$, $4^g$ of the driving pump should therefore be held in contact with the disks 12 by the said counter pressure but by way of precaution a ring 19 has been provided for each group of rollers 10; this ring surrounds them in such a manner as to hold them constantly in contact with the disk 12. While the two disks 12 of the driven pump always present the same eccentricity relatively to the axis of rotation of the durm 1, the eccentricity of the disks 12 of the driving pump is adjustable; they are mounted on the trunnion 20 which is integral with an anchor 21 arranged in the interior of the separator plate 3, in such a manner as to be vertically displaceable therein; with this object the anchor is engaged by tapping it with a threaded rod 22 which projects to the exterior of the apparatus and upon which an operating hand wheel 23 is keyed.

The anchor is shown in Figs. 1, 2, 3 and 4 in its upper position; the delivery from the driving pump is then the maximum and consequently the driven pump rotates at the maximum speed and oppositely to the driving pump. If the anchor be caused to descend progressively the eccentricity of the disks 12 of the driving pump is diminished; the delivery from the latter diminishes and the driven pump rotates less and less rapidly. When the descent of the anchor brings the center of the double disk 12 into coincidence with the axis of rotation of the drum 1, the delivery from the driving pump becomes zero and the driven pump stops. In continuing to lower the anchor the disks 12 are rendered eccentric in the downward direction; it is then the cylinders of the driving pump which pass to the right of Fig. 2 which deliver through the orifice 18 liquid under pressure to the driven pump; the direction of rotation of the latter is then changed, that is to say it rotates in the same direction as the driving pump and through the orifice 17 delivers to the latter the liquid which issues from its cylinders. With the object of avoiding hydraulic recoils, which might arise from an abnormal resistance upon the driven shaft or from any other cause, each of the orifices 17 and 18 of the separator plate comprises: 1. A delivery valve 24 (Fig. 3) intended to enable the liquid under excess pressure at a given moment to escape into the reservoir. 2. A suction valve 25 (Fig. 3) owing to which any vacuum produced in the pumps would immediately be compensated for by an admission of liquid drawn from the reservoir. (These latter valves also serve for automatically filling the pumps on first starting).

In the example illustrated in Figs. 8, 9 and 10 each of the members 8 bears by means of a head $b$ of spherical convexity against a corresponding spherical concavity $a$ of the piston. Upon a shaft $c$, carried by the head $b$, a roller 10 is mounted inside this head. The member 8 is provided externally, as in the preceding example, with two trunnions 9 the geometrical axis of which coincides preferably with that of the shaft $c$ and upon each of which there is mounted a roller 11. The rollers 11 are in engagement in the radial slideways 13 integral with the drum 1.

In the embodiments of the invention described above, each of the drums 1 is carried by ball bearings; one of them (26 Fig. 1) is established between the end cup of the casing 2 and the shaft which is itself integral with the drum 1 by means of a central nipple 27 and teeth 28. The other bearing 29 is established between the drum 1 and the separator plate 3. On the other hand a spring 30 interposed between the plug 37 of the casing 2 and a ball bearing 31, presses the drum longitudinally so as to apply it exactly against the slide face 14. Or an automatic thrust device for the slide faces might be employed. For each of the pumps this device comprises a cylinder 32 provided with a cupped leather which permits of causing the liquid under pressure to act upon a certain annular section of the shaft; this liquid under pressure enters the conduit 38 through one or other of the valves 33 or 34 (Fig. 3), which rises under the influence of the pressure which exists, according to the direction of rotation in one or other of the conduits 17 or 18.

The apparatus is provided with a reservoir 35 (Fig. 1) serving on the one hand to compensate for losses of oil by supplying the same through passages $35^a$, Fig. 1, and $35^b$, Fig. 3, to the interior of the apparatus and on the other hand to permit of the expansion of the oil resulting from the heating due to prolonged operation. For this purpose passages $24^a$ are provided in the separator plate 3 between the exterior space of the drums 1 and the valve controlled spaces 17 and 18. See Figs. 3 and 7. Two tubular sockets 36 pass through this reservoir and serve for filling and for the escape of the air from the casings 2.

In the embodiments of the invention which have just been described, a spherical joint is provided between each end plate $1^a$, Fig. 1, of the cylinder carrying drums 1 and the corresponding bearing face $14^a$ of plate 14 which is fast to the separator plate 3. The center of each spherical joint is located at the intersection of the longitudinal axis of the apparatus and a median vertical plane of each outer bearing. In Fig. 1 only one center $x$ is thus indicated. This arrangement presents the advantage of enabling the drum to adjust itself always on the distributer notwithstanding slight imperfections of construction or fitting and this is impossible with plane slide faces in which the least inexactitude in the construction or finish makes itself felt in defective perpendicularity of the slide face of the drum upon the actual axis of rotation determined by the centers of the supporting bearings 26, 29 of the drum upon the casing; from this it follows that the drum and the distributer no longer present the absolute contact necessary for a perfect joint.

Although spherical slide faces present the advantage indicated above as compared with plane faces, it is still necessary in order to insure a good joint, to have recourse to a certain pressure of application which gives rise to loss of work due to friction.

What I claim as my invention and desire to secure by Letters Patent in the United States is:—

1. In a hydraulic transmission apparatus of the character described, the combination of a plurality of radially disposed revolubly mounted cylinders, pistons working in said cylinders and thrust members having jointed connections with the pistons and provided with lateral projections, guides engaging said projections arranged parallel with the axes of the cylinders whereby lateral thrust of the pistons on the cylinders is avoided and means for reciprocating said thrust members.

2. In a hydraulic transmission apparatus of the character described, the combination of a plurality of radially disposed revolubly mounted cylinders, pistons working in said cylinders and thrust members having ball and socket connections with the pistons and provided with lateral projections, guides engaging said projections arranged parallel with the axes of the cylinders whereby lateral thrust of the pistons on the cylinders is avoided and means for reciprocating said thrust members.

3. In a hydraulic transmission apparatus of the character described, the combination of a plurality of radially disposed revolubly mounted cylinders, pistons working in said cylinders, an adjustable cam for regulating the throw of the pistons, thrust members having jointed connections with said pistons and provided with anti-friction bearings traveling on said cam and means for guiding each thrust member in line with the axis of its cylinder.

4. In a hydraulic transmission apparatus of the character described, the combination of a plurality of radially disposed revolubly mounted cylinders, pistons working in said cylinders, cam disks adjustably mounted and adapted to regulate the throw of said pistons, thrust members having jointed connections with said pistons and provided with anti-friction bearings traveling on said cam disks, means retaining said bearings on said disks as the cylinders revolve, and means guiding each of said thrust members in line with the axes of said cylinders.

5. In a hydraulic transmission apparatus of the character described, the combination of a rotary cylinder motor and a rotary cylinder pump, a separator plate having openings through which said motor and pump may communicate, and means intermediate said plate and each of said elements for centering the latter.

6. In a hydraulic transmission apparatus of the character described, the combination of a pump having a rotary casing, a motor having a rotary casing, and a separator plate intermediate said elements and having openings through which said pump and motor may communicate and presenting concave surfaces, said casings having corresponding convex surfaces adapted to engage said concave surfaces and center said casings.

In testimony whereof I have signed this specification in the presence of two subscribing witnesses.

EUGÈNE SCHNEIDER.

Witnesses:
H. C. COXE,
R. DE SEVELINGES.